Jan. 8, 1963 W. J. RUSSELL 3,072,338
THERMOSTATIC VALVE CONTROL
Filed March 10, 1960 3 Sheets-Sheet 3

United States Patent Office 3,072,338
Patented Jan. 8, 1963

3,072,338
THERMOSTATIC VALVE CONTROL
William J. Russell, Malvern, Pa., assignor to Robertshaw-Fulton Controls Company, Richmond, Va., a corporation of Delaware
Filed Mar. 10, 1960, Ser. No. 14,111
9 Claims. (Cl. 236—48)

This invention relates to flow control devices and more particularly to a combined gas cock and valve means for controlling and regulating thermostatically a flow of gaseous fuel to the burner of an appliance, such as a gas stove.

An object of this invention is to thermostatically control both the main valve and the minimum flow bypass valve in a thermostatic control device.

Another object of this invention is to control thermostatically a minimum fuel flow at all temperature settings in a thermostatic control device.

This invention has a further object in that the main flow and the minimum flow of fuel to a fuel burner is sequentially controlled by thermostatic action.

In the preferred embodiment of this invention, the casing of the thermostatic control device is formed with an inlet and an outlet and a manually operable control valve is disposed in the casing adjacent the inlet. A pair of separately actuated valve means thermostatically controls main and minimum flow of fuel to the outlet by separate portions of a pivotally mounted lever and means is operatively disposed between one portion of the lever to pivot the same whereby the pair of valve means are actuated in sequence.

Other objects and advantages of this invention will become apparent from the following description taken in connection with the accompanying drawings wherein.

Figure 1:
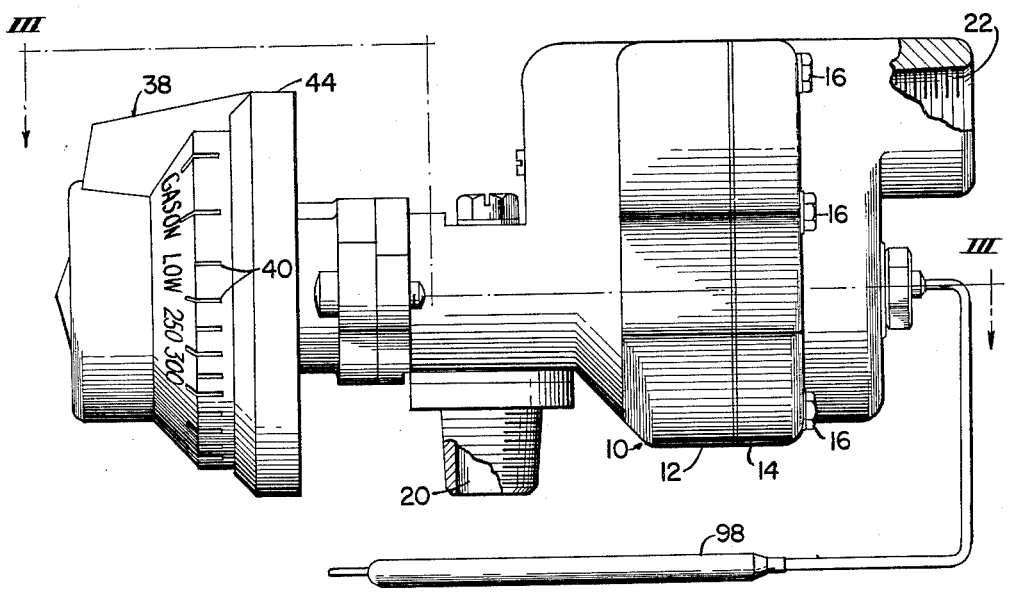
FIG. 1 is a side elevation of a thermostatic control device embodying this invention.
Figure 3:
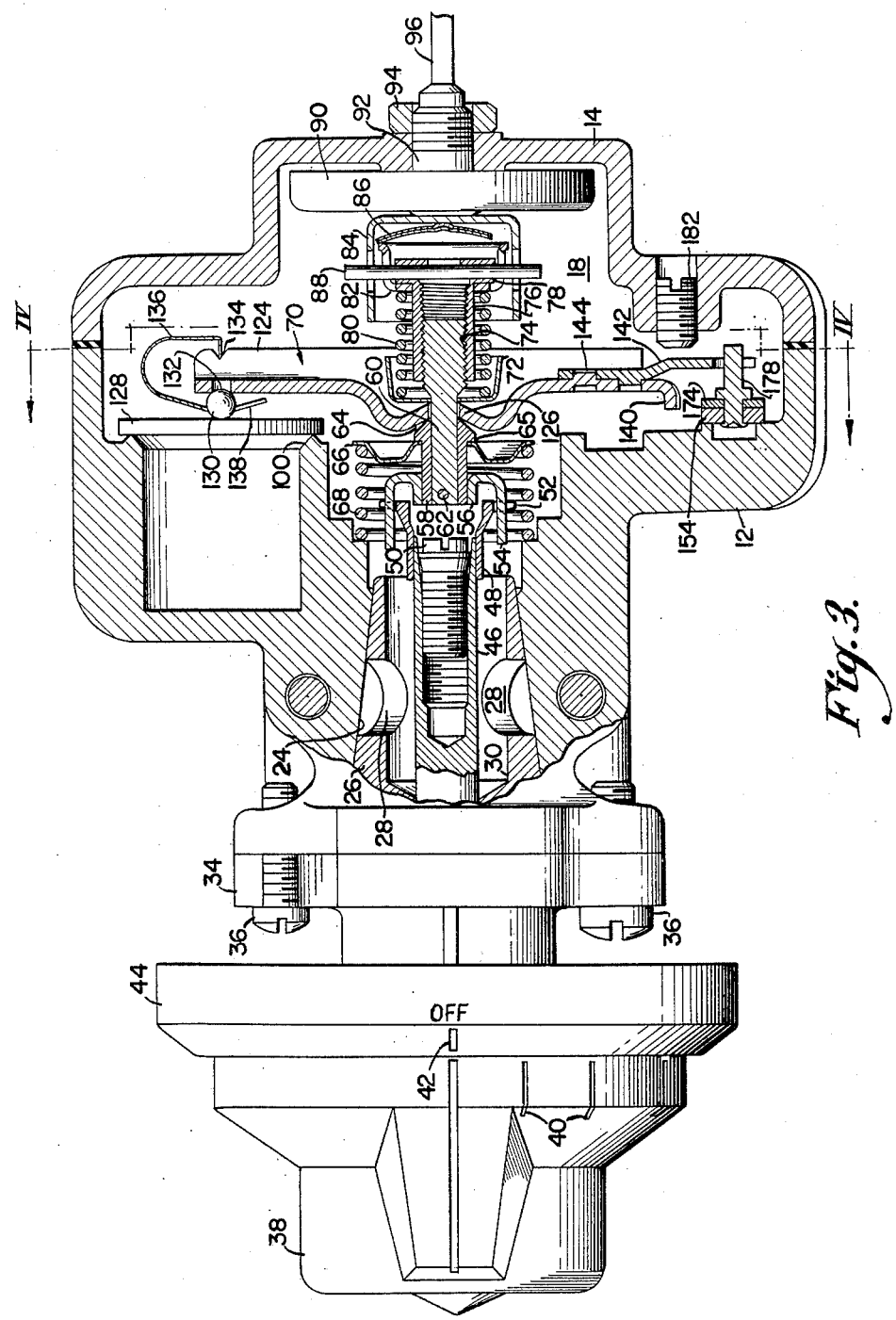
FIG. 3 is an enlarged partial section taken on line III—III of FIG. 1.

As is illustrated in FIG. 1, the thermostatic control device includes a casing, indicated generally at 10, having a front section 12 and a rear section 14 secured together by any suitable means, such as cap screws 16, and defining a valve chamber 18 (FIG. 3). The front section 12 is provided with an inlet passage 20 adapted to receive a flow of gaseous fuel from a supply line (not shown). The rear section 14 is provided with an outlet passage 22 adapted to supply a flow of fuel to a suitable burner, such as the burner in a gas oven (not shown). The front section 12 is open at one end and provided with a frustoconical bore forming a tapered valve seat 24 which intersects the inlet passage 20 and communicates with the valve chamber 18. A generally hollow shutoff cock or valve member 26 has a corresponding tapered surface for rotatable cooperation with the tapered valve seat 24.

A pair of similarly constructed ports 28 are transversely arranged in the hollow valve member 26 and are interconnected by an arcuate port (not shown). The pair of ports 28 and the arcuate port are adapted to register with the inlet passage 20 to permit a flow of gas from inlet 20 to an internal bore 30 of the valve member 26.

Oppositely disposed to the bore 30, the shutoff valve member 26 is formed with a cylindrical stem extending through the opening in the front casing 12. A generally cylindrical guide cover 34 surrounds the cylindrical stem and is provided with a pair of oppositely disposed mounting ears for securing the same to the front end of the casing section 12 by any suitable fastening means, such as cap screws 36. As is well known in the art, the cylindrical stem of the shutoff valve member 26 is operatively connected to a control knob dial 38 which is manually rotatable to cause rotation of the valve member 26 to a selected position. The control knob dial 38 is provided with suitable temperature setting indicia 40 which cooperate with a fixed index 42 formed on a bezel ring 44 which is mounted on the cylindrical portion of the guide cover 34.

An operating shaft 46 extends through the hollow valve member 26 having one end operatively connected to the cylindrical valve stem for unitary rotation with the valve member 26. The opposite end of the operating shaft 46 is disposed in the valve chamber 18 for attachment to a slidable torque transmitting connection. This connection is effected through a cylindrical member 48 secured to the operating shaft 46 by means of a conical headed wedging screw 50 threaded therein.

A peripheral flange on the cylindrical member 48 is provided with a pair of oppositely disposed slots 52 which receive a pair of tongues 54 integrally extending from a cup-shaped driving member 56. The cup-shaped drive 56 is mounted on a cylindrical bushing 58 and both are rigidly secured to one end of an adjusting stem 60 by means of a transverse pin 62. The opposite end of the bushing 58 is provided with a rounded nose portion 64 and an annular shoulder 65 which carries a spring retainer 66. A coil spring 68 is mounted in compression between an internal shoulder formed by a wall of the casing and the spring retainer 66 and thus biases the adjusting stem 60 towards the rear of the casing, as viewed in FIG. 3.

A centrally apertured lever 70 is mounted on the adjusting stem 60 with one surface abutting the annular nose 64. The opposite surface of the lever 70 abuts a retainer washer 72 which is slidably mounted on the adjusting stem 60. The other end of the adjusting stem 60 is externally threaded at 74 for reception in an internally threaded tubular adjusting element 76 having an integrally formed flange 78. An override spring 80 in the form of a helical coil encircles the tubular element 76 and is mounted in compression between the retainer washer 72 and the bottom wall of a centrally apertured cup-shaped member 82 which is mounted on the tubular element 76 in abutting relation with the flange 78. A relatively larger second cup-shaped element 84 is oppositely disposed to and encloses the first cup-shaped member 82. A curved bimetal compensating element 86 of a well known type engages the bottom wall of the cup-shaped member 84 and has a periphery engaging the lip of the first cup-shaped member 82. Diametrically opposed slots are provided in the cup-shaped members 82 and 84 and are adapted to receive a transverse pin 88 which prevents rotation of the cup-shaped members and the tubular adjusting element 76.

The exterior bottom wall of the cup-shaped member 84 is centrally fixed to the exterior wall of a contractible and expansible power element 90 which may be of any suitable type known in the art. The power element 90 is mounted on the interior wall of the rear section 14 by means of a threaded stud 92 and a lock nut 94. The stud 92 is provided with a central bore (not shown), one end of which communicates with the interior of the power element 90 while its other end receives the end of a capillary tube 96 which in turn is connected to a temperature sensing bulb 98 suitably positioned in a space to be temperature controlled.

The power element 90, the stud 92, the capillary tube 96, and the sensing bulb 98 constitute a closed system filled with an expansible fluid so that a variation of temperature sensed by the bulb 98 produces a corresponding expansion or contraction of the power element 90. A corresponding axial movement of the adjusting stem 60 is effective to produce movement of the lever 70.

An internal casing wall defining a part of chamber 18 is formed with a main flow valve seat 100 communicating with an internal passageway 102 (FIG. 4) leading to the outlet passage 22.

Another part of the internal casing wall is formed with a minimum flow valve seat 104 (FIG. 5), which leads to an internal passageway 106 which in turn communicates with a second internal passageway leading to the outlet passage 22. The front casing section 12 is provided with a small bore 110 being axially aligned with and extending into communication with the internal passageway 106. A flow restrictor 112 is threaded into the outer portion of bore 110 and comprises an inner sleeve 114 which intersects the internal passageway 106 for adjusting the minimum flow of fuel therethrough.

Figure 2:
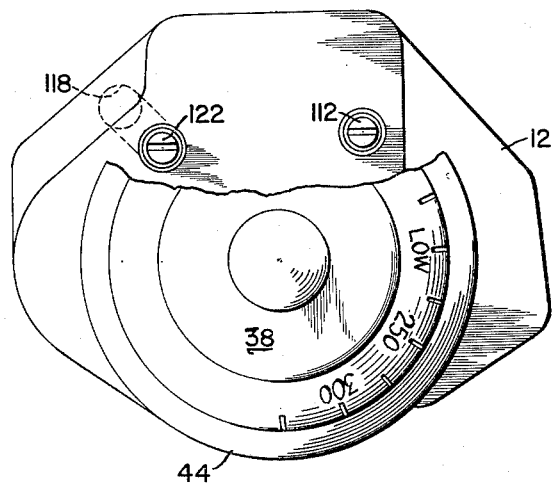
FIG. 2 is a front elevation of the device in FIG. 1 with parts broken away.
Figure 4:
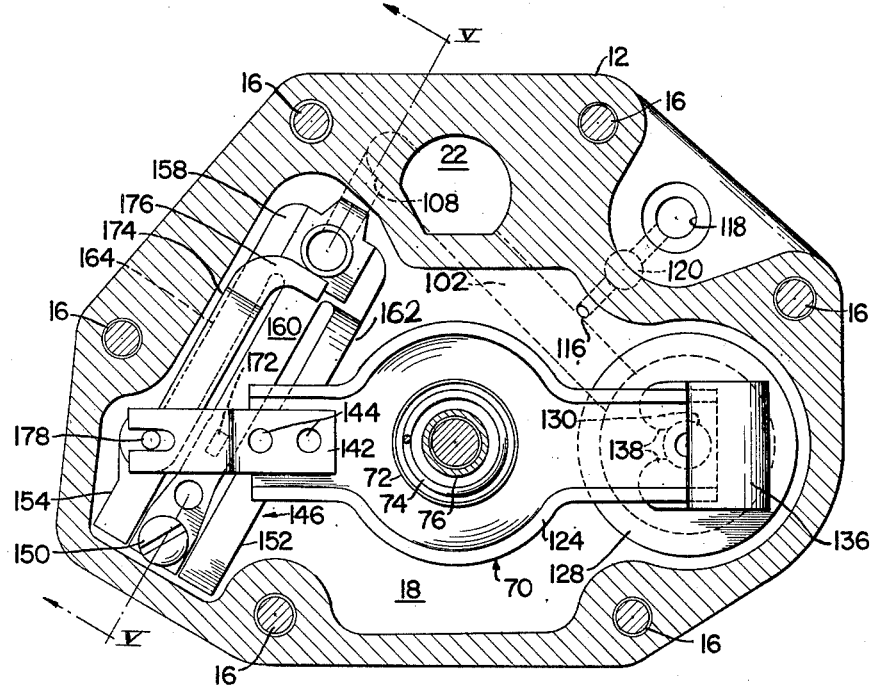
FIG. 4 is a section taken on line IV—IV of FIG. 3.

As is illustrated in FIG. 4, the casing is also provided with a small internal bore 116 which establishes a pilot flow passageway to maintain a flow of fluid through a pilot outlet passage 118. The front casing section 12 has a second small bore 120 receiving a flow restrictor 122 (FIG. 2), which is similar to the previously described flow restrictor 112 and which intersects the pilot flow bore 116 for adjusting a flow of fuel to the pilot outlet 118.

As is illustrated in FIG. 3, the side edges of the lever 70 are perpendicularly bent forming downturned flanges 124 and providing lever 70 with a substantially U-shaped cross section. A conical depression 126 surrounds the central aperture of lever 70 and engages the rounded nose 64 to form a pivotal connection therewith. A disc-type throttling valve 128 is pivotally mounted at one end of the lever 70 to cooperate with the valve seat 100. A ball 130 is integrally secured to the rear face of the disc valve 128 and rests in an apertured seat 132, located adjacent the end of the lever 70. The flanges 124 are provided in alignment with the seat 132 with V-shaped bearing notches 134 which receive one end of a generally C-shaped spring member 136. The opposite end of spring member 136 is bifurcated and has two leg members 138 straddling the ball 130 to retain the same against the apertured seat 132.

The opposite end of lever 70 has a downturned tang 140 extending from one surface and a bifurcated extension arm 142 secured to its opposite surface as by press-fittings 144. A snap acting mechanism, indicated generally at 146, is actuated by the tank 140 and comprises a generally U-shaped mounting member 148 secured to an internal casing wall as by a screw 150. The free ends of legs 152 and 154 of the U-shaped mounting member 148 are notched to present bearing grooves.

Figure 5:
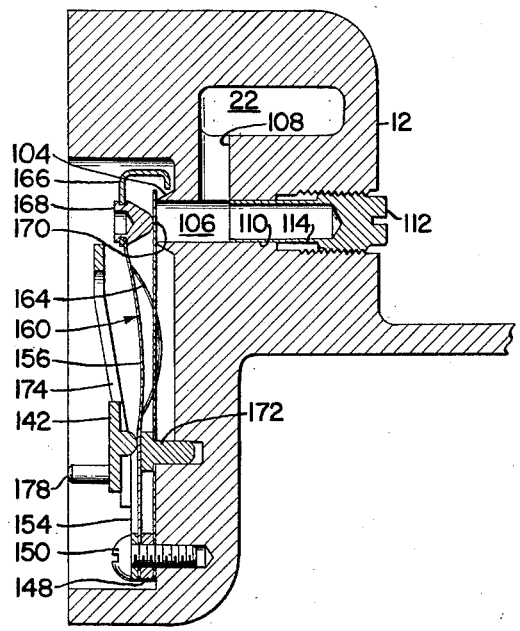
FIG. 5 is a section taken on line V—V of FIG. 4.

A switch blade 156 is stamped from a sheet of highly resilient material and comprises a flat end piece 158 and a central longitudinally extending arm 160. The switch blade further includes a pair of side legs 162 and 164 extending from the end piece 158 in the same general direction as the tongue 160 and terminating adjacent the free ends of the legs 152 and 154. The free ends of the legs 162 and 164 constitute knife edges which are mounted in the bearing grooves in the legs 152 and 154, respectively. As is illustrated in FIG. 5, the legs 162 and 164 are mounted in compression and assume a bowed configuration in their assembled position.

A generally U-shaped bracket 166 has a long leg attached to the end piece 158 by means of a button-headed rivet 168. The short leg of bracket 166 underlies and is adapted to engage a reed-type valve member 170. The reed valve member 170 consists of an elongated strip of resilient material having a fixed end attached to mounting member 148 by the screw 150 and having a portion adjacent its free end for cooperation with the valve seat 104. The button part of the rivet 168 is substantially conical and overlies the reed valve member 170 for moving the same towards the valve seat 104. A T-shaped stop pin 172 extends through the reed valve 170 and is securely mounted in the internal casing wall. The pin 172 underlies the switch blade tongue 160 and provides a rigid stop therefor when the same is moved by the actuating tang 140.

A rigid blade 174 overlies the switch leg 164 and has a perpendicularly bent tang 176 on one end disposed above the long leg of the bracket 166 to form a stop member for the switch blade. The other end of the rigid blade 174 is rigidly secured to the leg 154 of the mounting member 148 by means of a pin 178 having one end peened over to form a unitary mounting with the leg 154. The other end of the pin 178 is disposed in the space defined by the bifurcated end of the lever extension 142 to prevent lever 70 from rotating when the adjusting stem 60 is rotated.

As is illustrated in FIG. 3, a set screw 182 is threaded through a bore in the rear casing section 14; the inner end of screw 182 is adapted to abut the lever extension 142 and provides an adjustable stop means therefor.

In order to place the thermostatic control device in operation, the control knob dial 38 is rotated counter-clockwise to a desired temperature setting causing rotation of the gas cock 26 and the cylindrical drive member 48 which in turn rotates the adjusting stem 60 in the tubular adjustment element 76. Upon the gas cock 26 being rotated to an "on" position, one of its ports 28, or a combination of one of such ports with the arcuate groove therebetween, depending upon the particular temperature setting, registers with the inlet passage 20 to permit a flow of gas into the chamber 18.

The rotation of the adjusting stem 60 causes linear movement of the lever 70 toward the rear of the casing, as viewed in FIG. 3. The rearward linear movement of the lever 70 causes a similar movement of the tang 140, thus decreasing the force supplied to the switch blade tongue 160. As soon as the switch blade tongue 160 moves through the dead-center position, the force of the snap acting mechanism is reversed in direction whereby the bracket 166 lifts the reed valve 170 to an open position. In this position, the highest degree of spring force of this switch blade is exerted against the tang 140 and forces the lever extension 142 into abutting relation with the adjusting set screw 182 which thus serves as a secondary pivot point for the lever 70. The adjusting set screw 182 may be selectively positioned to adjust the degrees of temperature span between the "snap on" and the "throttle on" points of the thermostatic control device. As the snap acting mechanism is being moved through its overcenter position, the lever 70 is being pivoted counterclockwise, as viewed in FIG. 3, about a primary pivot point defined by the ball 130 and its seat 132.

The continued rotation of the control knob dial 38 causes further rearward movement of the lever 70 whereby the lever 70 is pivoted on the set screw 182 and the valve disc 128 is moved to its open position relative to the valve seat 100. With both valve members in an open position, there is a flow of gas from the chamber 18 through the minimum flow bypass valve seat 104 to the outlet passage 22 and a main flow through the valve seat 100 through the internal passageway 102 to the outlet passage 22 and, thence, to a suitable burner for ignition.

As the temperature of the space being heated by the burner approaches that for which the dial 38 has been set, the sequence of operation of the throttling valve 128 and the snap valve 170 is reversed as the thermally responsive means moves the lever 70 frontward or to the left, as is viewed in FIG. 3. During the forward axial movement of the lever 70, the force exerted on the tang 140 by the snap acting mechanism is sufficient to resist movement of the lever 70 and cause a pivotal movement of the lever 70 in a counterclockwise direction, as viewed in FIG. 3, about the pivot point of the set screw 182. Thus, the main flow of fuel is gradually reduced as the valve disc 128 is moved closer to the valve seat 100 in accordance with temperature increases until slightly below the predetermined set temperature, the valve seat 100 is fully closed and the only flow of fuel is through the minimum flow valve seat 104.

At this time, the minimum flow may be manually adjusted by rotation of the flow restrictor 112 to insure proper combustion and to minimize heat losses in the space being heated. Should the controlled temperature exceed the set temperature, the further expansion of the power element 90 now causes clockwise pivotal movement of the lever 70, resulting in actuation of the snap acting mechanism by the tang 140. Movement of the blade 160 through its dead center position causes the button 168 to move the reed valve 170 against the valve seat 104 so that the minimum flow of fuel is cut off with a snap action. With no gas input to the burner, temperature at the sensing bulb 98 will decrease, resulting in a slight contraction of the power element 90. The coincident movement of the lever 70 again results in actuation of the snap acting mechanism to open the minimum flow valve 170 and fuel is supplied to the burner at a minimum flow determined by the reset adjustment of the flow restrictor 112.

In the conventional oven and burner combination, the minimum flow of fuel is not controlled with the result that the oven temperatures exceed the preset low temperature setting so often desired in an oven. By utilizing the snap acting type of control described above, it is possible to obtain low temperatures with good ignition and combustion characteristics as well as a low differential. Thus, by periodic minimum flow, it is possible to supply just the right input to balance oven losses at low temperatures.

From the foregoing it is apparent that the main flow valve means and the minimum flow valve are operated in sequence due to the high force exerted against the lever 70 by the snap acting mechanism. Furthermore, the sequence of operation does not require completion but rather may be interrupted and reversed in accordance with temperature variations.

Inasmuch as the above description and drawings are subject to various changes in structural details and reversals of parts, it is intended that the foregoing description and drawings be interpreted as illustrative and not in a limiting sense.

I claim:

1. In a thermostatic control device, the combination comprising a casing having an inlet and an outlet, a main passageway communicating with said outlet for supplying a main flow of fuel thereto, a bypass passageway communicating with said outlet for supplying a minimum flow of fuel thereto, valve means operatively disposed in said casing adjacent said inlet for initiating a flow of fuel into said casing, main valve means operatively disposed in said main passageway for regulating the main flow of fuel to said outlet, bypass valve means operatively disposed in said bypass passageway for controlling the minimum flow of fuel to said outlet, a lever arm having one end operatively connected to said main valve means, snap acting means forming an operative connection between another end of said lever arm and said bypass valve means, and thermally responsive means having a movable member operatively connected to said lever arm intermediate the ends thereof for moving the same, said snap acting means biasing said another end of said lever arm whereby movement thereof causes sequential actuation of said main valve means and said bypass valve means.

2. In a thermostatic control device, the combination comprising a casing having an inlet and an outlet, means defining a chamber in said casing between said inlet and outlet, valve means operatively disposed in said chamber adjacent said inlet for controlling a flow of fuel into said chamber, means in said chamber defining a pair of valve seats communicating with said outlet, a main flow valve member cooperating with one of said seats for controlling a main flow of fuel from said chamber to said outlet, a minimum flow valve member cooperating with the other of said seats for controlling a minimum flow of fuel from said chamber to said outlet, a lever member having one end carrying said main flow valve member, a snap acting mechanism operatively disposed between another end of said lever member and said minimum flow valve member, thermally responsive means including a shaft member operatively connected to said lever member intermediate the ends thereof for moving said main and minimum flow valve members relative to their corresponding valve seats, said snap acting mechanism exerting a biasing force on said another end of said lever member whereby the main flow valve member and the minimum flow valve member are actuated in sequence.

3. In a thermostatic control device, the combination comprising a hollowed casing having an inlet and an outlet, a valve chamber in said casing communicating with said inlet, control valve means operatively disposed in said casing adjacent said inlet for controlling a flow of fuel to said chamber, means in said chamber defining a main flow valve seat establishing communication between said chamber and said outlet, means in said chamber defining a minimum flow valve seat establishing a second communication between said chamber and said outlet, thermally responsive means including a shaft member in said casing movable in response to temperature variations, drive connecting means between said shaft member and said control valve means whereby operation of said control valve means selectively positions said shaft member, a lever member operatively connected to said shaft for movement in response to temperature variations, a main flow valve member carried by said lever member for cooperation with said main valve seat and forming a first pivot for said lever member, a second pivot for said lever mounted in said chamber, a minimum flow valve member operatively mounted in said chamber for cooperation with said minimum flow valve member, a snap acting mechanism operatively connected to said minimum flow valve member for actuating the same and resiliently engaging said lever member whereby movement of said lever member against the bias of said snap acting mechanism causes said lever to move about said first and second pivots in sequence whereby said main and minimum flow valve members are operated in sequence.

4. The combination as recited in claim 3 wherein said second pivot is adjustable for selectively varying pivotal movement of said lever member.

5. The combination as recited in claim 3 wherein said second pivot comprises a set screw adjustably extending through said casing for manual adjustment exterior of said casing.

6. In a thermostatic control device, the combination comprising a casing having an inlet and an outlet, said casing having two passageways between said inlet and said outlet, separate valve means operatively disposed in said casing for regulating the flow of fuel through each of said passageways, each of said valve means being operatively interconnected to a single lever arm connected to a transversely movable shaft, a first pivotal projection formed inside said casing to form a first pivot for said single lever arm whereby one of said valve means may be disengaged upon transverse movement of said transversely movable shaft in one direction to cause the lever arm to pivot about said first pivot, and a second pivotal projection formed inside said casing to form another pivot for said single lever arm whereby the other of said valve means may also be disengaged upon further transverse movement of said transversely movable shaft in one direction to cause said lever arm to now pivot about said other pivot.

7. In a thermostatic control device, the combination comprising a casing having an inlet and an outlet, said casing have two passageways between said inlet and said outlet, separate valve means operatively disposed in said casing for regulating the flow of fuel through each of said passageways, each of said valve means being operatively interconnected to a single lever arm connected to a transversely movable shaft, a first pivotal projection formed on one of said valve means to form a first pivot for said single lever arm whereby the other of said valve means may be disengaged upon transverse movement of said transversely movable shaft in one direction to cause said lever arm to pivot about said first pivot, and a second pivotal projection formed on the wall of said casing to form another pivot for said single lever arm whereby said one valve means may also be disengaged upon further transverse movement of said transversely movable shaft in one direction to cause said lever arm to now pivot about said other pivot.

8. In a thermostatic control device, the combination comprising a casing having an inlet and an outlet, said casing having two passageways between said inlet and said outlet, separate valve means operatively disposed in said casing for regulating the flow of fuel through each of said passageways, each of said valve means being operatively interconnected to a single lever arm connected to a transversely movable shaft, a first pivotal projection formed in said casing to form a first pivot for said single lever arm whereby one of said valve means may be disengaged upon transverse movement of said transversely movable shaft in one direction to cause said lever arm to pivot about said first pivot, and a second pivotal projection formed inside said casing to form another pivot for said single lever arm whereby the other of said valve means may also be disengaged upon further transverse movement of said transversely movable shaft in said one direction to said lever arm to now pivot about said other pivot, and a snap actuated mechanism operatively associated with one of said valve means to cause complete and rapid engagement or disengagement of that valve means.

9. In a thermostatic control device, the combination comprising a casing having an inlet and outlet, said casing having two passageways between said inlet and said outlet, separate valve means operatively disposed in said casing for regulating the flow of fuel through each of said passageways, each of said valve means being operatively interconnected to a single lever arm connected to a transversely movable shaft, a first pivotal projection formed on one of said valve means to form a first pivot for said single lever arm whereby the other of said valve means may be disengaged upon transverse movement of said transversely movable shaft in one direction to cause said lever arm to pivot about said first pivot, and a second pivotal projection formed on the wall of said casing to form another pivot for said single lever arm whereby said one valve means may also be disengaged upon further transverse movement of said transversely movable shaft in said one direction to cause said lever arm to now pivot about said other pivot, and a snap actuated mechanism operatively associated with one of said valve means to cause complete and rapid engagement or disengagement of that valve means.

References Cited in the file of this patent

UNITED STATES PATENTS

| | | |
|---|---|---|
| 2,004,597 | Birtch | June 11, 1935 |
| 2,121,977 | Newell | June 28, 1938 |
| 2,228,198 | Cerny | July 7, 1941 |
| 2,807,422 | McCarty et al. | Sept. 24, 1957 |
| 2,889,115 | Weber | June 2, 1959 |